US012593092B2

(12) United States Patent
Kang

(10) Patent No.: US 12,593,092 B2
(45) Date of Patent: Mar. 31, 2026

(54) DISPLAY DEVICE

(71) Applicant: LG ELECTRONICS INC., Seoul (KR)

(72) Inventor: Byeongkook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 18/699,572

(22) PCT Filed: Oct. 14, 2021

(86) PCT No.: PCT/KR2021/014233
§ 371 (c)(1),
(2) Date: Apr. 8, 2024

(87) PCT Pub. No.: WO2023/063448
PCT Pub. Date: Apr. 20, 2023

(65) Prior Publication Data
US 2024/0406485 A1    Dec. 5, 2024

(51) Int. Cl.
*H04N 21/43* (2011.01)
*H04N 21/426* (2011.01)
*H04N 21/4425* (2011.01)

(52) U.S. Cl.
CPC ... *H04N 21/4305* (2013.01); *H04N 21/42607* (2013.01); *H04N 21/4425* (2013.01)

(58) Field of Classification Search
CPC ......... H04N 21/4305; H04N 21/42607; H04N 21/4425
See application file for complete search history.

(56) References Cited

U.S. PATENT DOCUMENTS 5,029,014 A * 7/1991 Lindstrom ............... H04N 7/08
348/E7.024
5,600,366 A * 2/1997 Schulman .......... H04N 21/4622
348/E7.063
5,619,274 A * 4/1997 Roop ................... H04N 21/435
348/E5.103
5,659,350 A * 8/1997 Hendricks ............ H04N 21/482
725/116

(Continued)

FOREIGN PATENT DOCUMENTS

KR    1020120127997    11/2012
KR    1020150042951    4/2015

OTHER PUBLICATIONS

PCT International Application No. PCT/KR2021/014233, International Search Report dated Jul. 7, 2022, 2 pages.

*Primary Examiner* — Michael B. Pierorazio
(74) *Attorney, Agent, or Firm* — LEE, HONG, DEGERMAN, KANG & WAIMEY

(57) ABSTRACT

The present disclosure relates to a method and an apparatus for operating in a wireless communication system, the method comprising the operations of: receiving configuration information related to CSI prediction; and deriving predicted CSI for a second time point later than a first time point from CSI for the first time point, based on the configuration information, wherein based on the predicted CSI satisfying an event, actual CSI for the second time point, measured from a reference signal is transmitted, and wherein based on the predicted CSI not satisfying the event, CSI reporting for the second time point is dropped.

14 Claims, 9 Drawing Sheets

100

(56) References Cited

U.S. PATENT DOCUMENTS

| | | | | |
|---|---|---|---|---|
| 5,774,170 | A * | 6/1998 | Hite | H04N 7/0887 |
| | | | | 725/35 |
| 5,805,974 | A * | 9/1998 | Hite | H04N 21/812 |
| | | | | 725/71 |
| 5,835,487 | A * | 11/1998 | Campanella | H04H 20/74 |
| | | | | 370/320 |
| 5,886,995 | A * | 3/1999 | Arsenault | H04N 21/2385 |
| | | | | 348/E7.063 |
| 5,889,950 | A * | 3/1999 | Kuzma | H04N 21/4622 |
| | | | | 348/E7.063 |
| 5,920,702 | A * | 7/1999 | Bleidt | H04N 21/658 |
| | | | | 710/30 |
| 5,978,649 | A * | 11/1999 | Kahn | H04N 7/165 |
| | | | | 348/E7.063 |
| 6,002,393 | A * | 12/1999 | Hite | H04N 21/812 |
| | | | | 348/E7.063 |
| 6,029,045 | A * | 2/2000 | Picco | H04N 21/25891 |
| | | | | 348/E7.063 |
| 6,035,038 | A * | 3/2000 | Campinos | H04N 7/163 |
| | | | | 340/5.74 |
| 6,035,397 | A * | 3/2000 | Campinos | H04N 21/2347 |
| | | | | 348/E7.056 |
| 6,105,060 | A * | 8/2000 | Rothblatt | H04B 7/18584 |
| | | | | 709/219 |
| 6,141,530 | A * | 10/2000 | Rabowsky | H04N 7/17345 |
| | | | | 348/436.1 |
| 6,157,719 | A * | 12/2000 | Wasilewski | H04N 7/1675 |
| | | | | 725/31 |
| 6,160,989 | A * | 12/2000 | Hendricks | H04N 21/42204 |
| | | | | 348/E5.103 |
| 6,330,719 | B1 * | 12/2001 | Zigmond | H04L 67/62 |
| | | | | 348/E7.071 |
| 6,473,137 | B1 * | 10/2002 | Godwin | H04N 21/4384 |
| | | | | 348/731 |
| 6,546,556 | B1 * | 4/2003 | Kataoka | H04N 7/165 |
| | | | | 725/35 |
| 6,603,816 | B1 * | 8/2003 | Hamada | H04N 21/4112 |
| | | | | 375/E7.278 |
| 6,799,326 | B2 * | 9/2004 | Boylan, III | H04N 21/478 |
| | | | | 725/138 |
| 10,448,090 | B2 * | 10/2019 | Choi | H04N 19/46 |
| 11,158,229 | B2 * | 10/2021 | Lim | G09G 3/20 |
| 11,463,135 | B2 * | 10/2022 | Murakami | H04W 72/04 |
| 2001/0003846 | A1 * | 6/2001 | Rowe | H04N 21/435 |
| | | | | 348/E7.063 |
| 2001/0004733 | A1 * | 6/2001 | Eldering | G06Q 30/0268 |
| | | | | 725/35 |
| 2001/0014970 | A1 * | 8/2001 | Kamperman | H04N 21/47211 |
| | | | | 725/31 |
| 2002/0003884 | A1 * | 1/2002 | Sprunk | H04N 21/835 |
| | | | | 375/E7.009 |
| 2002/0035730 | A1 * | 3/2002 | Ollikainen | H04M 11/00 |
| | | | | 725/116 |
| 2002/0035731 | A1 * | 3/2002 | Plotnick | H04N 21/234336 |
| | | | | 348/E7.063 |
| 2002/0056102 | A1 * | 5/2002 | Dillon | H04N 21/47214 |
| | | | | 386/E5.001 |
| 2002/0107940 | A1 * | 8/2002 | Brassil | H04N 21/23424 |
| | | | | 709/219 |
| 2002/0144260 | A1 * | 10/2002 | Devara | H04N 21/23608 |
| | | | | 725/136 |
| 2002/0166120 | A1 * | 11/2002 | Boylan, III | H04N 21/4312 |
| | | | | 725/35 |
| 2003/0070169 | A1 * | 4/2003 | Beyers, II | H04N 7/17318 |
| | | | | 348/E7.071 |
| 2003/0110499 | A1 * | 6/2003 | Knudson | G06Q 30/0251 |
| | | | | 348/E7.071 |
| 2003/0126594 | A1 * | 7/2003 | Tsuria | H04N 21/4623 |
| | | | | 348/E7.063 |
| 2006/0248559 | A1 * | 11/2006 | Michener | H04N 21/233 |
| | | | | 725/147 |
| 2008/0028425 | A1 * | 1/2008 | Inui | H04N 5/602 |
| | | | | 725/38 |
| 2008/0137848 | A1 * | 6/2008 | Kocher | G11B 20/00231 |
| | | | | 380/201 |
| 2013/0051476 | A1 * | 2/2013 | Morris | H04N 19/137 |
| | | | | 375/E7.026 |
| 2015/0163501 | A1 * | 6/2015 | Cho | H04L 12/2854 |
| | | | | 375/240.26 |
| 2017/0026152 | A1 * | 1/2017 | Atungsiri | H04L 1/0041 |
| 2017/0373918 | A1 * | 12/2017 | Kwak | H04N 21/4345 |
| 2018/0287759 | A1 * | 10/2018 | Kundargi | H04W 56/0035 |
| 2020/0022100 | A1 * | 1/2020 | Simon | H04L 7/0037 |
| 2020/0045560 | A1 * | 2/2020 | Vermani | H04B 7/024 |
| 2020/0127808 | A1 * | 4/2020 | Takahashi | H04N 21/4302 |
| 2020/0296576 | A1 * | 9/2020 | Ouchi | H04L 5/001 |
| 2021/0012118 | A1 * | 1/2021 | Bohacik | G06V 20/20 |
| 2021/0028917 | A1 * | 1/2021 | Park | H04W 72/23 |
| 2021/0241668 | A1 * | 8/2021 | Lim | G09G 3/20 |

* cited by examiner

Carrier Number(Frequency)

OFDM Symbol(Time)

▨ Edge Pilot Group 1    ▨ Edge Pilot Group 2    ▨ Scattered Pilot Group 1    ▨ Scattered Pilot Group 2    ☐ Payload Cell Channel Impulse response

DISPLAY DEVICE

CROSS-REFERENCE TO RELATED APPLICATION(S)

This application is the National Stage filing under 35 U.S.C. 371 of International Application No. PCT/KR2021/014233, filed on Oct. 14, 2021, the contents of which are all incorporated by reference herein in its entirety.

TECHNICAL FIELD

This disclosure relates to a display device. More specifically, the present disclosure relates to a display device that demodulates a broadcast channel of the ATSC 3.0 standard.

BACKGROUND ART

ATSC 3.0 is an American digital TV broadcasting standard, and was adopted as the domestic terrestrial ultra-high definition (UHD) broadcasting standard in 2016, and terrestrial UHD broadcasting using it began in 2017. ATSC 3.0 has the advantage of being capable of transmitting high-definition video data at high speeds using Internet Protocol (IP), enabling multi-channel broadcasting and two-way services, and having high compatibility.

When the display device receives a broadcast signal of the ATSC 3.0 standard, the display device can decode the broadcast signal according to a clock signal. Specifically, the display device can output the clock signal according to the clock frequency and decode the data signal and pilot signal included in the broadcast signal according to the clock signal. However, in this case, a problem occurs in which the multiplied component of the clock signal is induced as noise component at the frequency of a specific channel.

DISCLOSURE

Technical Problem

An object of the present disclosure is to provide a display device with improved reception performance for broadcast signals of the ATSC 3.0 standard.

An object of the present disclosure is to provide a display device that minimizes the problem of a pilot signal, which is a reference signal of broadcast signals of the ATSC 3.0 standard, is distorted by the harmonic component of a clock signal.

Technical Solution

A display device according to an embodiment of the present disclosure includes a control unit configured to receive a channel selection command; and a tuner configured to receive data corresponding to the channel selected according to the channel selection command, in which the control unit may be configured to set a filter corresponding to the selected channel by detecting a pilot pattern based on a clock frequency, and perform error correction based on the set filter, and the clock frequency may be variable based on the number of errors.

The control unit may be configured to, when the number of errors is a preset reference number or more, change the clock frequency, and, when the number of errors is less than the reference number, maintain the clock frequency.

The control unit may be configured to change the clock frequency so that a harmonic component of a clock signal does not overlap with the pilot signal.

The control unit may be configured to determine whether the clock frequency is changed each time the channel selection command is received.

The control unit may be configured to, when the channel is changed, set an operating clock frequency to a default clock frequency, and determine the operating clock frequency based on the number of errors according to the default clock frequency.

The control unit may be configured to, even if the channel is changed, maintain the current clock frequency as the operating clock frequency, and change the operating clock frequency based on the number of errors according to the current clock frequency.

The control unit may be configured to, when the clock frequency is changed at the time of changing the channel, store a table mapping the clock frequency corresponding to each changed channel.

The control unit may be configured to, when the channel selection command is received, obtain the clock frequency mapped to the channel selected from the table and change to the operating clock frequency.

The control unit may be configured to preset the clock frequency for each channel while performing automatic channel search.

The control unit may be configured to preset the prohibited frequency band of the clock frequency for each channel, and, when the operating clock frequency is a prohibited frequency band preset for the current channel, change the operating clock frequency.

The control unit may change the clock frequency based on the number of errors when a channel according to ATSC 3.0 is selected.

The least common multiple of the changed clock frequency and the pre-change clock frequency may be 865 or more.

The control unit may be configured to change each frequency corresponding to the preset frequency band to the operating clock frequency, calculate the number of errors for each changed frequency, and determine the frequency with the smallest calculated error as the operating clock frequency.

The minimum frequency of the predetermined frequency band may be 10 MHz.

The maximum frequency of the predetermined frequency band may be 20 MHz.

Advantageous Effect

According to an embodiment of the present disclosure, there is an advantage in securing reception performance for broadcast signals of the ATSC 3.0 standard. In addition, this has the advantage of enabling normal output of video and audio signals even in areas where RF signals are weak.

According to an embodiment of the present disclosure, there is an advantage of lower design cost compared to existing technologies such as spread spectrum.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
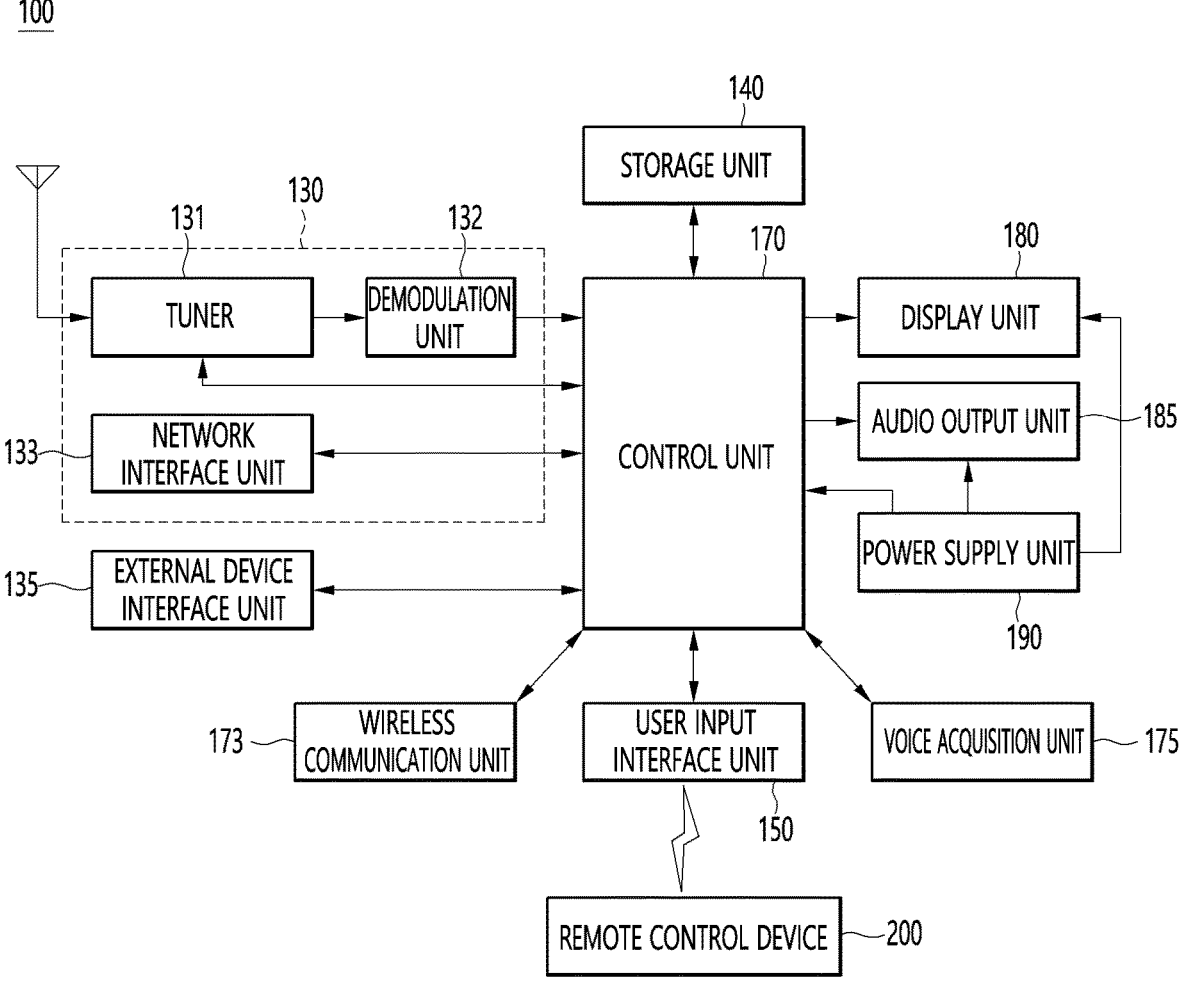
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulation unit 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. In other words, the network interface unit 133 may transmit or receive data to or from a corresponding server by accessing a predetermined webpage through the network.

The network interface unit 133 may receive content or data provided from a content provider or a network operator. In other words, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not illustrated) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100

(or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not illustrated) and may acquire audio around the display device 100 through the microphone (not illustrated).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 illustrated in FIG. 1 is just one embodiment of the present disclosure and thus, some of the components illustrated may be integrated, added, or omitted according to the specification of the actually implemented display device 100.

In other words, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
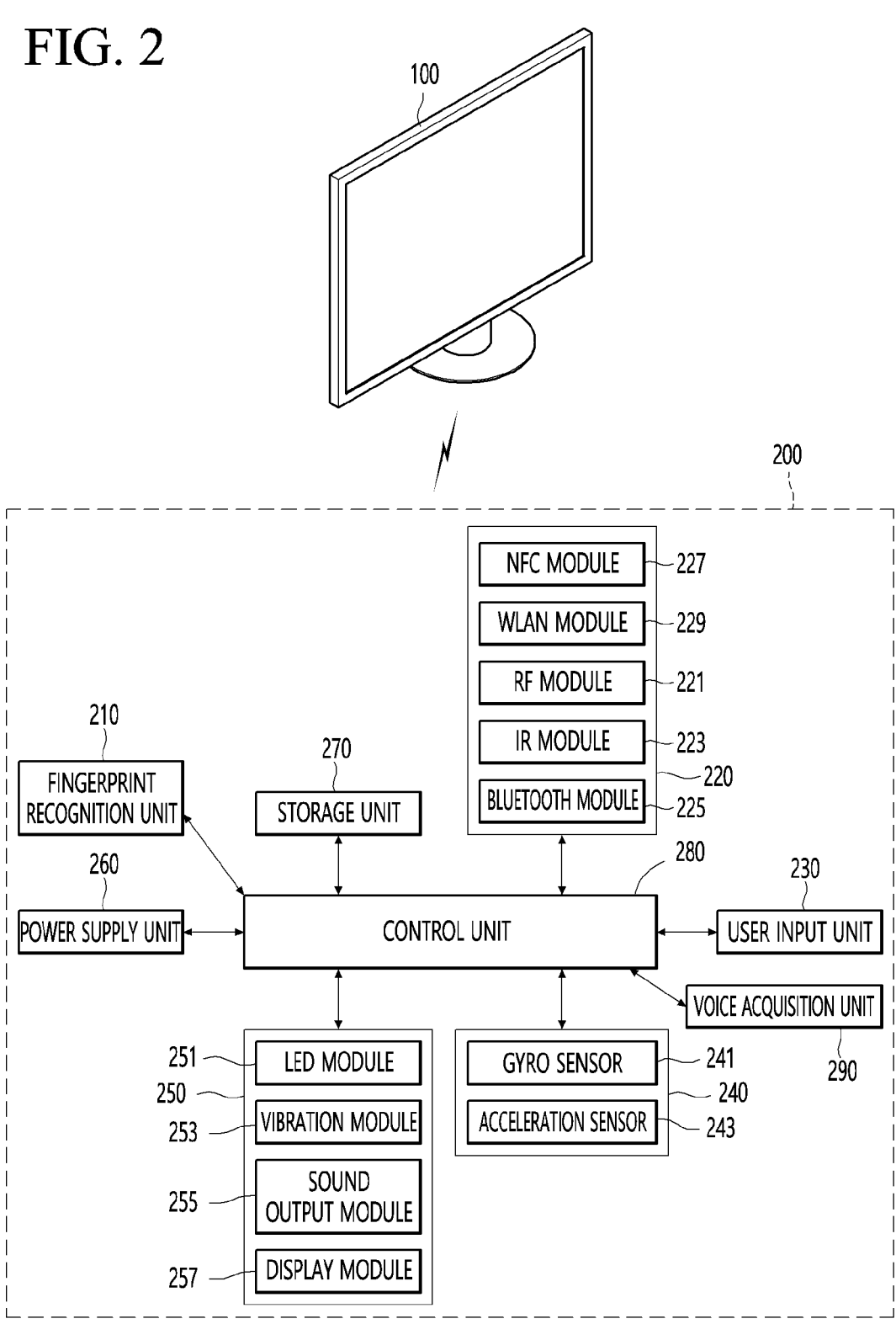
FIG. 2 is a block diagram illustrating a remote control device according to an embodiment of the present disclosure.
Figure 3:
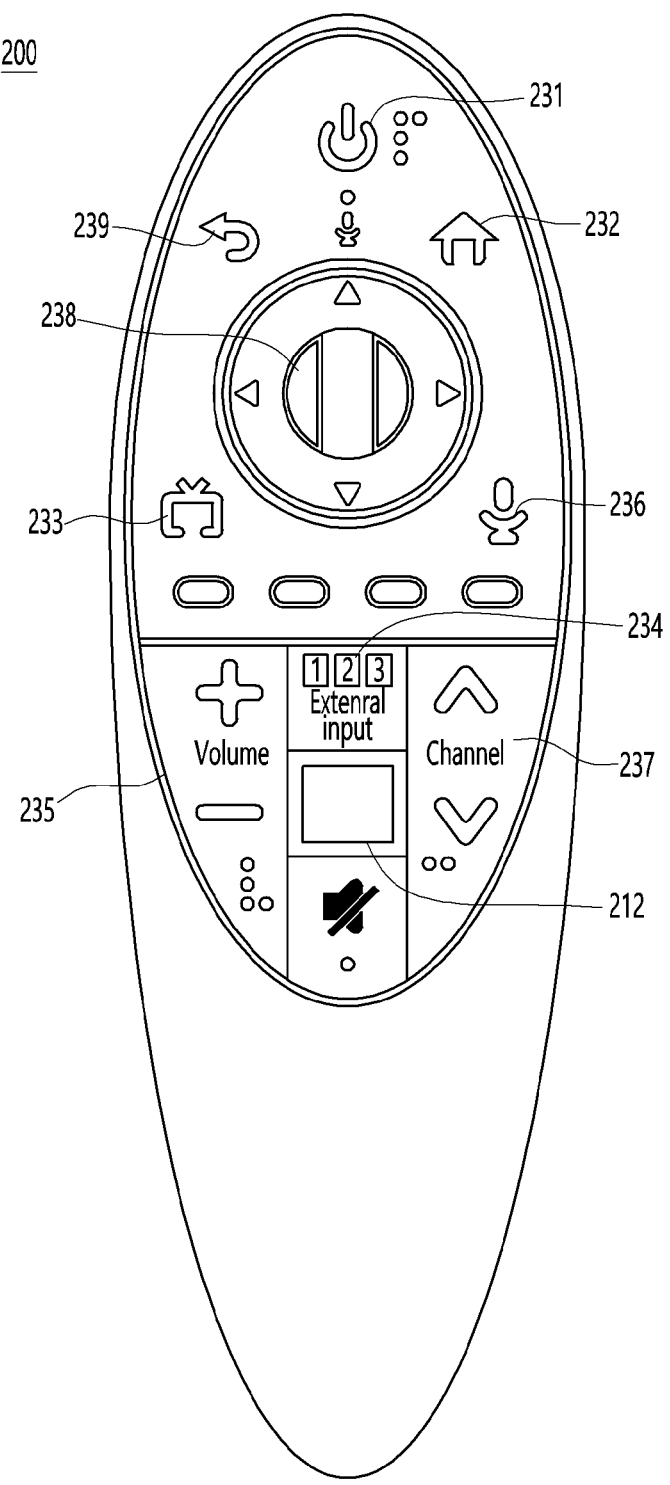
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
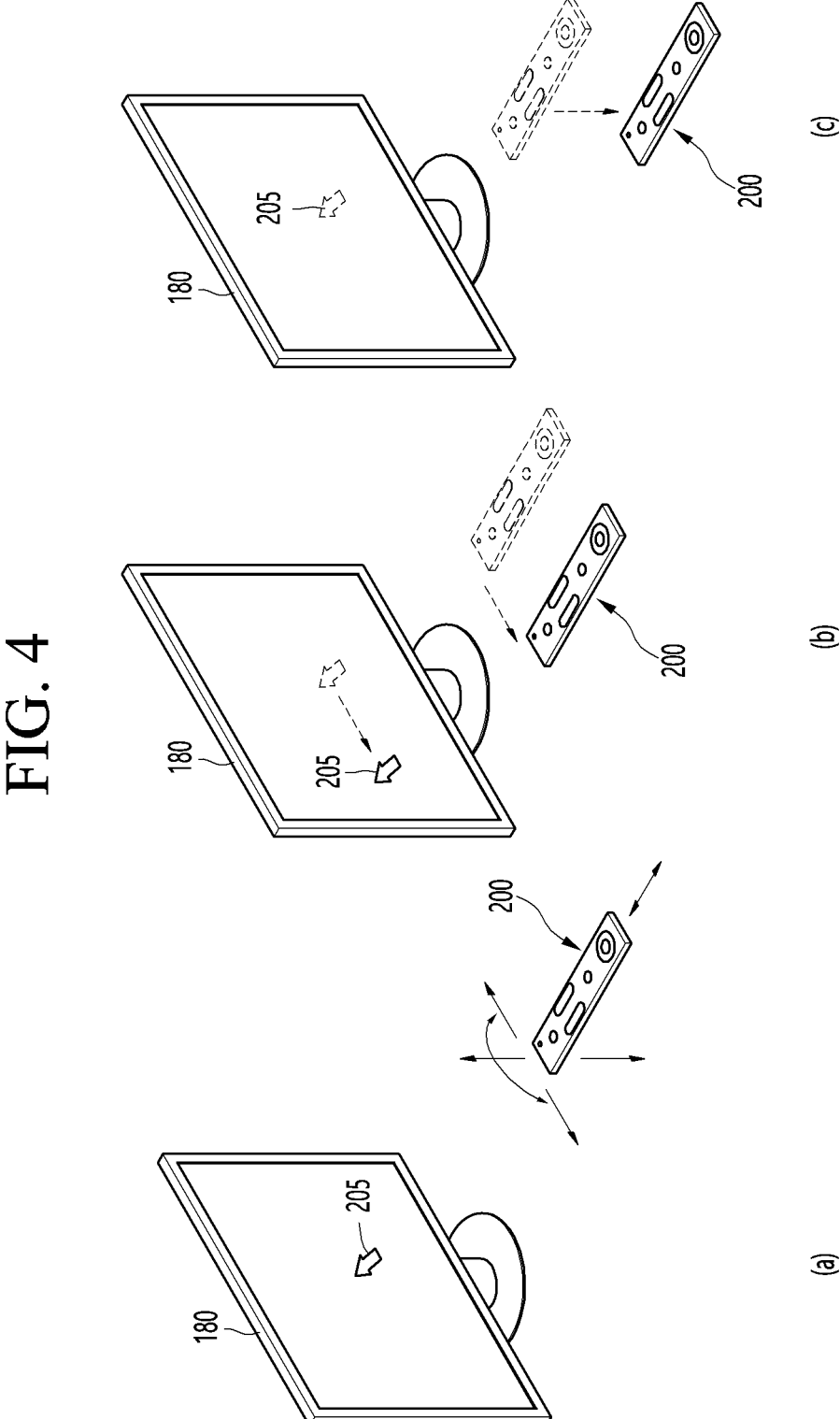
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4 (*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4 (*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4 (*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. In other words, if the remote control device 200 is moved away from or closer to the display unit 180, the up, down, left, or right movement cannot be recognized and only the back and forth movement may be recognized.

While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the display device 100 may receive a broadcast signal of the ATSC 3.0 standard. These broadcast signals may include data signals and pilot signals. The pilot signal may be for channel estimation and synchronization. ATSC 3.0, which uses orthogonal frequency division (OFDM) modulation, supports 16 types of pilot patterns.

Each pilot signal may form a pilot pattern. The control unit 170 may perform channel estimation by detecting a pilot pattern through a pilot signal.

Figure 5:
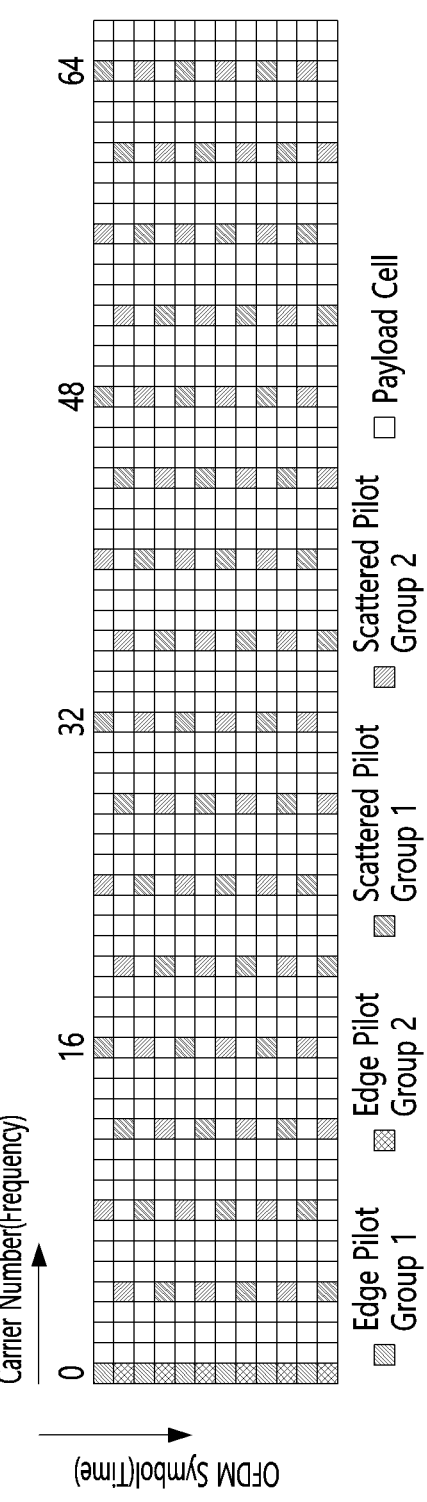
FIG. 5 is an example diagram illustrating a pilot pattern present in an ATSC 3.0 signal.
Figure 6:
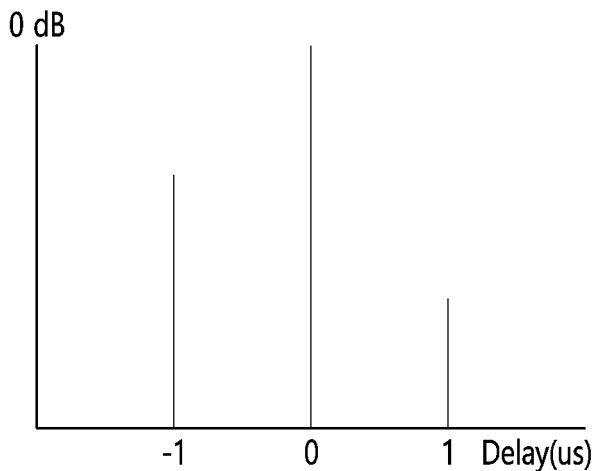
FIG. 6 is an example diagram illustrating a channel impulse response for channel estimation.

FIG. 5 is an example diagram illustrating a pilot pattern present in an ATSC 3.0 signal, and FIG. 6 is an example diagram illustrating a channel impulse response for channel estimation.

Although an edge pilot and a scattered pilot are illustrated in FIG. 5, these are merely examples.

The control unit 170 may perform channel estimation using a pilot pattern. Specifically, the control unit 170 can detect a channel impulse response (CIR) through a pilot pattern. Referring to the example of FIG. 6, it can be checked that the control unit 170 detects CIRs such as −1 us 0 dB (Pre echo), 0 us 0 dB, and 1 us 0 dB (Post echo), and through this, signals are received through three paths. The control unit 170 can estimate a channel and set a channel filter by referring to the CIR.

However, a problem may occur in which the pilot signal is distorted by the clock signal of the demodulation unit 132. Specifically, the demodulation unit 132 outputs a clock signal, and the multiplied component of the output clock signal may be induced as a noise component of the broadcast signal received by the tuner 131.

Figure 7:
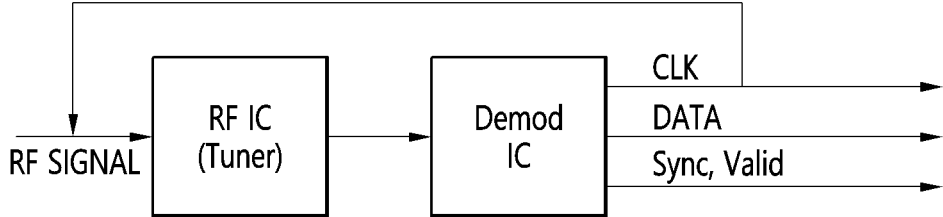
FIG. 7 is a block diagram illustrating how a clock signal is induced as a noise component of a broadcast signal.
Figure 8:
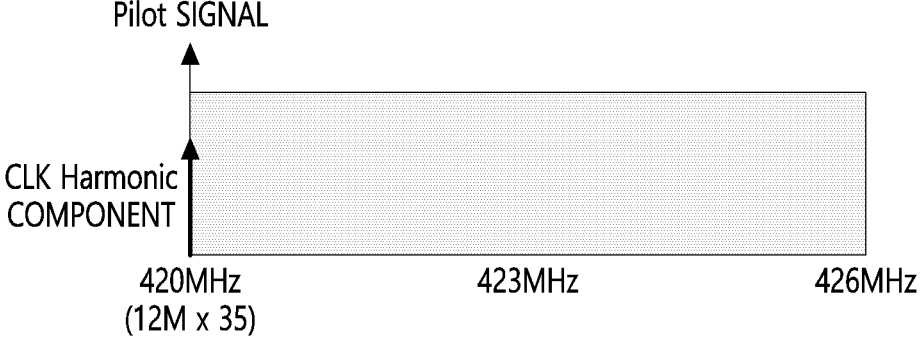
FIG. 8 is a graph illustrating how the harmonic component of the clock signal is induced into the noise component of the broadcast signal.

FIG. 7 is a block diagram illustrating how a clock signal is induced as a noise component of a broadcast signal, and FIG. 8 is a graph illustrating how the harmonic component of the clock signal is induced into the noise component of the broadcast signal.

The RF IC illustrated in FIG. 7 may correspond to the tuner 131 described in FIG. 1, and the demodulation IC Demod IC illustrated in FIG. 7 may correspond to the demodulation unit 132 described in FIG. 1.

The tuner 131 may receive a broadcast signal, that is, an RF signal, corresponding to the selected channel. The demodulation unit 132 may output a clock signal (CLK), a data signal (DATA), and a control signal (Sync, Valid, or the like) based on the RF signal received by the tuner 131.

The clock signal CLK may be a signal output so that the configuration of the control unit 170, the display unit 180, or the like operates properly. The clock signal CLK may be output at every cycle determined according to the clock frequency.

Data signals (DATA) may include video signals, audio signals, or data related to broadcast programs.

The control signal may be a synchronization signal (Sync) and the validity signal (Valid) may be a signal for restoration of the data signal.

However, as illustrated in FIG. 7, the clock signal may be induced as a noise component of the RF signal received by the tuner 131.

For example, the broadcast signal frequency of channel 57 may be 423 MHz and the clock frequency may be 12 MHz. In this case, the RF signal received by the tuner 131 may be as illustrated in FIG. 8, and the RF signal may include a pilot signal of 420 MHz. However, 420 MHz is 12 MHz×35, which can be the 35 multiplied component of the clock signal. In other words, the multiplied component of the clock signal may be induced as a noise component at the frequency of channel 57 (420 to 426 MHz).

Accordingly, the display device according to an embodiment of the present disclosure seeks to minimize the problem of the multiplied component of the clock signal being induced as noise of the broadcast signal by varying the clock frequency.

Figure 9:
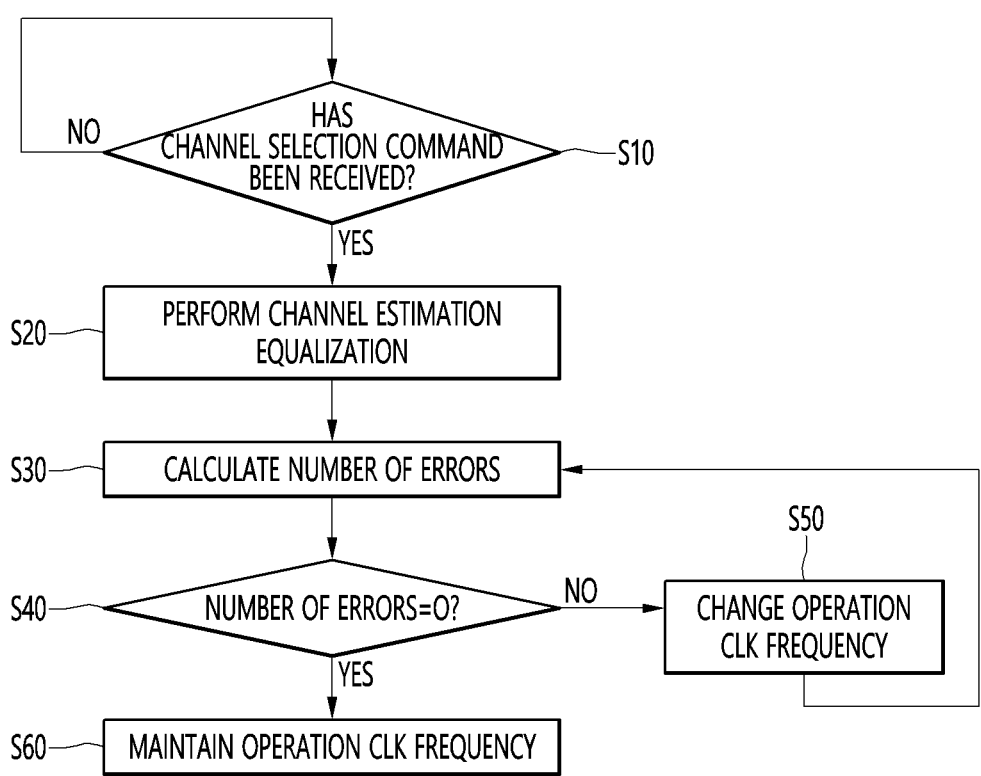
FIG. 9 is a flowchart illustrating a method for operating a display device according to an embodiment of the present disclosure.

FIG. 9 is a flowchart illustrating a method for operating a display device according to an embodiment of the present disclosure.

The control unit 170 may obtain whether a channel selection command is received (S10).

In other words, the control unit 170 may determine whether a channel selection command has been received. The control unit 170 may receive data corresponding to the channel selected according to the channel selection command through the tuner 131.

The channel selection command refers to a command for selecting or changing a channel to be viewed and may be received through input from a button provided on the display device 100 itself or a button provided on the remote control device 200. The channel selection command may be a command that selects the number of a specific channel or changes the channel above (next) or below (previous) the current channel.

In particular, the control unit 170 can perform operations described later when a channel according to ATSC 3.0 is selected. In other words, the control unit 170 can change the clock frequency based on the number of errors when a channel according to ATSC 3.0 is selected. However, this is only an example, and it is reasonable that the present disclosure is not limited to channels according to ATSC 3.0.

When receiving a channel selection command, the control unit 170 may perform channel estimation equalization (S20).

Channel estimation equalization may be an operation to estimate and compensate for distortion of symbol size and phase due to multi-path attenuation of wireless signals. For example, the control unit 170 may detect a pilot pattern from a received wireless signal based on a clock frequency and estimate a channel through the detected pilot pattern. The control unit 170 can set a channel filter by referring to the EQ signal environment through channel estimation.

The control unit 170 may perform forward error correction (FEC) after performing channel estimation equalization. Forward error correction refers to an encoding technology that corrects bit errors that occur on a communication line based on received information. In other words, the control unit 170 may perform an operation to detect and correct errors in data received through a channel filter set through channel estimation equalization. In other words, the control unit 170 can set a filter corresponding to the selected channel by detecting a pilot pattern based on the clock frequency and perform error correction based on the set filter. At this time, the clock frequency may be varied based on the number of errors, which will be explained in detail below.

The control unit 170 can calculate the number of errors (S30).

The control unit 170 may calculate the number of errors after performing forward error correction.

The control unit 170 may calculate the number of errors and then obtain whether the number of errors is 0 (S40).

In other words, the control unit 170 can determine whether the number of errors is 0.

If the number of errors is not 0, the control unit 170 can change the operating clock frequency (S50).

The operating clock frequency may refer to the clock frequency set in the demodulation unit 132. The demodulation unit 132 may output a clock signal according to the operating clock frequency.

The control unit 170 may change the clock frequency so that the harmonic component of the clock signal does not overlap with the pilot signal. Here, the harmonic component of the clock signal may represent a component having a frequency that is an integer multiple of the fundamental frequency of the clock signal. The control unit 170 may change the clock frequency so that the harmonic component of the clock signal does not affect the pilot signal of the RF signal.

Figure 10:
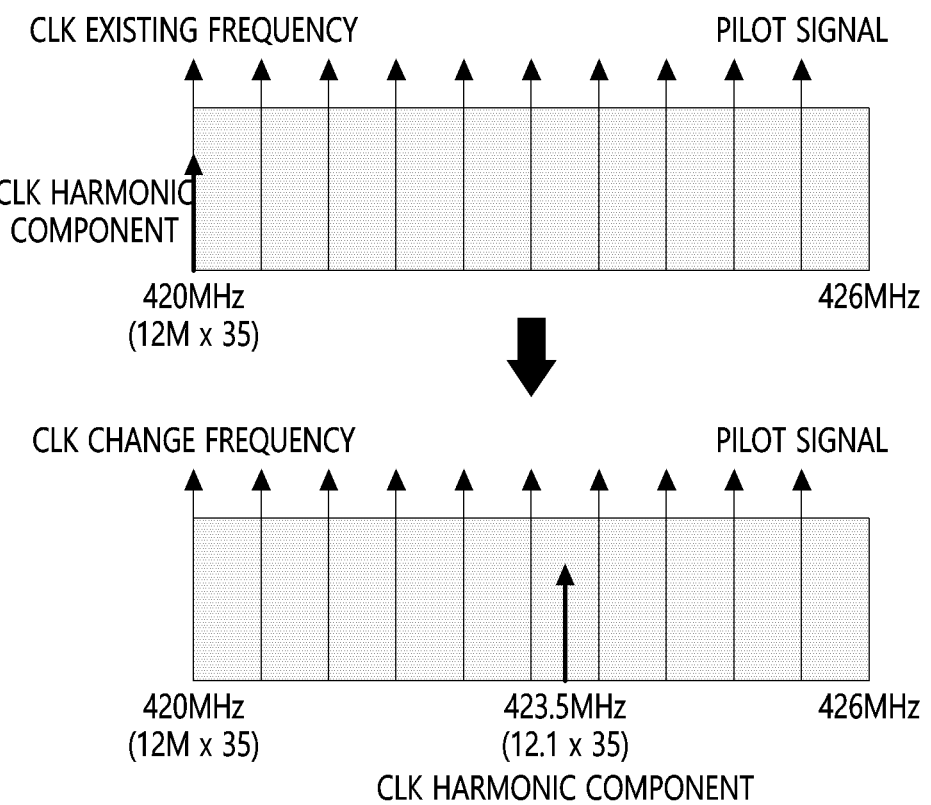
FIG. 10 is a graph illustrating a signal when the display device changes the operating clock frequency according to an embodiment of the present disclosure.

FIG. 10 is a graph illustrating a signal when the display device changes the operating clock frequency according to an embodiment of the present disclosure.

In FIG. 10, the CLK existing frequency may represent the operating clock frequency before change, and the CLK change frequency may represent the operating clock frequency after change.

When the harmonic component of the clock signal overlaps with the pilot signal, an error may occur in detection of the pilot signal. Accordingly, the control unit 170 can recognize when the harmonic component of the clock signal overlaps with the pilot signal. For example, the control unit 170 may recognize whether the harmonic component of the clock signal overlaps the pilot signal based on the number of errors as described in FIG. 9. The control unit 170 may change the operating clock frequency when the harmonic component of the clock signal overlaps with the pilot signal. In particular, the control unit 170 can change the operating clock frequency so that the harmonic component of the clock signal does not overlap with the pilot signal.

Accordingly, the problem of pilot signals being distorted by clock signal components can be minimized.

Meanwhile, in the case of a channel according to ATSC 3.0, the changed clock frequency may have a relationship with the clock frequency before the change in which the least common multiple is 865 or more. This is because channels according to ATSC 3.0 have a frequency of 54 to 864 MHz. Accordingly, the problem of the harmonic component of the clock signal overlapping with the pilot signal when using a channel according to ATSC 3.0 can be minimized.

Again, FIG. 9 will be described.

If the number of errors is not 0, the control unit 170 may change the operating clock frequency and calculate the number of errors again.

Meanwhile, the control unit 170 can maintain the operating clock frequency when the number of errors is 0 (S60).

In other words, if the number of errors is 0, the control unit 170 can select the operating clock frequency as the current clock frequency.

Meanwhile, as described above, determining whether to change the operating clock frequency according to whether the number of errors is 0 is only an example.

According to another embodiment of the present disclosure, the control unit 170 may determine whether to change the operating clock frequency by comparing the number of errors with a predetermined reference number.

Specifically, the control unit 170 may change the clock frequency if the number of errors is equal to or greater than a predetermined reference number, and may maintain the clock frequency if the number of errors is less than the predetermined reference number.

Here, the reference number may be set as default or may be set according to user input, but since this is only an example, it is reasonable that it is not limited thereto.

According to another embodiment of the present disclosure, the control unit 170 may change each frequency corresponding to a predetermined frequency band to an operating clock frequency, calculate the number of errors for each changed frequency, and determine the frequency with the smallest calculated error as the operating clock frequency. The predetermined frequency band may be 10 MHz to 20 MHz. In other words, the minimum frequency of the preset frequency band may be 10 MHz, and thus the problem of the bitrate being too small can be minimized. The maximum frequency of the preset frequency band may be 20 MHz, and EMI, noise, or the like can be minimized accordingly.

According to the embodiment illustrated in FIG. 9, the control unit 170 may determine whether the clock frequency is changed each time a channel selection command is received.

However, the clock frequency when changing the channel according to the channel selection command may vary according to the embodiment.

According to the first embodiment, the clock frequency may be fixed when the channel is changed. Specifically, the control unit 170 can set the operating clock frequency to the default clock frequency when the channel is changed. The default clock frequency may be set in advance when the display device 100 is manufactured. When the channel is changed, the control unit 170 can unconditionally set the operating clock frequency to the default clock frequency regardless of the channel number. In summary, when the channel is changed, the control unit 170 may set the operating clock frequency to the default clock frequency and determine the operating clock frequency based on the number of errors according to the default clock frequency.

According to the second embodiment, when the channel is changed, the clock frequency may be maintained at the current clock frequency. Specifically, the control unit 170 can maintain the current clock frequency as the operating clock frequency even if the channel is changed. For example, when the operating clock frequency in channel 10 was 12 MHz, the control unit 170 may maintain the operating clock frequency at 12 MHz when changing from channel 10 to channel 11. The control unit 170 may, in a state of maintaining the current clock frequency, calculate the number of errors according to the current clock frequency, and change the operating clock frequency based on the calculated number of errors.

According to the third embodiment, if the clock frequency is changed when the channel is changed, the control unit 170 may store a table mapping the clock frequencies corresponding to each changed channel in the storage unit 140. For example, when the clock frequency in channel 10 to 12 MHz is changed, the clock frequency in channel 11 to 13 MHz is changed, and the clock frequency in channel 12 to 10 MHz is changed, the control unit 170 may create and save a table mapping channels 10 and 12 MHz, mapping channel 11 and 13 MHz, and mapping channel 12 and 10 MHz.

When the control unit 170 receives a channel selection command, it can obtain the clock frequency mapped to the selected channel from the table and change it to the operating clock frequency. For example, if the above-mentioned table is stored, the control unit 170 can obtain 12 MHz from the table when changing to channel 10 and set it as the operating clock frequency.

According to the fourth embodiment, the control unit 170 may preset the clock frequency for each channel while performing automatic channel search. For example, while performing automatic channel search, the control unit 170 calculates the number of errors for each channel and obtains a clock frequency based on the number of errors, thereby creating and storing a table mapping the clock frequency for each channel.

Automatic channel search may be a function that automatically searches frequencies and registers available channels. If the clock frequency is acquired and stored in advance during automatic channel search, there is an advantage that when changing the channel later, no time is needed to search for a clock frequency that minimizes the number of errors in the changed channel.

According to the fifth embodiment, the control unit 170 may preset the forbidden frequency band of the clock frequency for each channel. Specifically, the above-described embodiments obtain or store an appropriate operating clock frequency for each channel. According to the fifth embodiment, the control unit 170 may preset a prohibition frequency that is not suitable as an operation clock frequency for each channel. For example, the control unit 170 may obtain an operating clock frequency in which the number of errors is a preset number or more and preset a prohibited frequency band according to the obtained operating clock frequency. The control unit 170 may change the operating clock frequency when the operating clock frequency is a preset prohibited frequency band for the current channel.

The present disclosure described above can be implemented as computer-readable code on a program-recorded medium. Computer-readable media includes all types of recording devices that store data that can be read by a computer system. Examples of computer-readable media include Hard Disk Drive (HDD), Solid State Disk (SSD), Silicon Disk Drive (SDD), ROM, RAM, CD-ROM, magnetic tape, floppy disk, optical data storage device, or the like. Additionally, the computer may include a control unit 170 of the display device 100. Accordingly, the above detailed description should not be construed as restrictive in all respects and should be considered illustrative. The scope of this specification should be determined by reasonable interpretation of the appended claims, and all changes within the equivalent scope of this specification are included in the scope of this specification.

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but rather to explain it, and the scope of the technical idea of the present disclosure is not limited by these embodiments.

The scope of protection of the present disclosure should be interpreted in accordance with the claims below, and all technical ideas within the equivalent scope should be construed as being included in the scope of rights of the present disclosure.

The invention claimed is:
1. A display device comprising:
   a controller configured to receive a channel selection command; and

15 a tuner configured to receive data corresponding to a channel that is selected according to the channel selection command, wherein the controller is configured to:

set a filter corresponding to the selected channel by detecting a pilot pattern of a pilot signal based on a clock frequency, and perform error correction based on the set filter, and wherein the clock frequency is variable based on a number of errors, and wherein the controller is further configured to:

when the number of errors is a preset reference number or more, change the clock frequency, and when the number of errors is less than the preset reference number, maintain the clock frequency.

2. The display device of claim 1, wherein the controller is further configured to: to change the clock frequency so that a harmonic component of a clock signal does not overlap with the pilot signal.

3. A display device comprising:

a controller configured to receive a channel selection command; and a tuner configured to receive data corresponding to a channel that is selected according to the channel selection command, wherein the controller is configured to:

set a filter corresponding to the selected channel by detecting a pilot pattern based on a clock frequency, and perform error correction based on the set filter, and wherein the controller is further configured to:

perform a determination of whether the clock frequency is changed each time the channel selection command is received, and change the clock frequency based on a result of the determination.

4. The display device of claim 3, wherein the controller is further configured to:

when the channel is changed by the channel selection command, set an operating clock frequency to a default clock frequency, and determine the operating clock frequency based on a number of errors according to the default clock frequency.

5. The display device of claim 4, wherein the controller is further configured to:

even if the channel is changed by the channel selection command, maintain a current clock frequency as an operating clock frequency, and change the operating clock frequency based on the number of errors according to the current clock frequency.

6. The display device of claim 3, wherein the controller is further configured to:

when the clock frequency is changed at a time of changing the channel, store a table mapping the clock frequency corresponding to each changed channel.

7. The display device of claim 6, wherein the controller is further configured to:

when the channel selection command is received, obtain the clock frequency mapped to the selected channel from the table and change to an operating clock frequency.

8. The display device of claim 3, wherein the controller is further configured to:

preset the clock frequency for each channel while performing automatic channel search.

9. The display device of claim 3, wherein the controller is further configured to:

preset a prohibited frequency band of the clock frequency for each channel, and when an operating clock frequency is a prohibited frequency band that is preset for a current channel, change the operating clock frequency.

10. The display device of claim 3, wherein the controller changes the clock frequency based on a number of errors when a channel according to ATSC 3.0 is selected.

11. The display device of claim 10, wherein a least common multiple of the changed clock frequency and a pre-change clock frequency is 865 or more.

12. A display device comprising:

a controller configured to receive a channel selection command; and a tuner configured to receive data corresponding to a channel that is selected according to the channel selection command, wherein the controller is configured to:

set a filter corresponding to the selected channel by detecting a pilot pattern based on a clock frequency, and perform error correction based on the set filter, and wherein the controller is further configured to:

change each frequency of the clock frequency corresponding to a predetermined frequency band to an operating clock frequency, calculate a number of errors for each changed frequency, and determine a frequency with a smallest calculated error as the operating clock frequency.

13. The display device of claim 12, wherein a minimum frequency of the predetermined frequency band is 10 MHz.

14. The display device of claim 12, wherein a maximum frequency of the predetermined frequency band is 20 MHz.

* * * * *